United States Patent
Telefus

(10) Patent No.: US 9,806,553 B2
(45) Date of Patent: Oct. 31, 2017

(54) DEPLETION MOSFET DRIVER

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/928,250

(22) Filed: Jun. 26, 2013

(65) Prior Publication Data

US 2014/0266321 A1    Sep. 18, 2014

Related U.S. Application Data

(60) Provisional application No. 61/799,124, filed on Mar. 15, 2013.

(51) Int. Cl.

| | |
|---|---|
| *H02J 7/02* | (2016.01) |
| *H04B 5/00* | (2006.01) |
| *H02J 50/12* | (2016.01) |
| *H02J 50/10* | (2016.01) |
| *H03K 17/00* | (2006.01) |
| *H02M 3/335* | (2006.01) |
| *H02M 3/28* | (2006.01) |

(52) U.S. Cl.
CPC .............. *H02J 7/025* (2013.01); *H02J 50/10* (2016.02); *H02J 50/12* (2016.02); *H02M 3/33507* (2013.01); *H03K 17/00* (2013.01); *H04B 5/0037* (2013.01); *H02M 3/28* (2013.01); *H02M 3/335* (2013.01)

(58) Field of Classification Search
CPC ...... H03K 17/00; H03K 17/60; H03K 17/687; H03K 17/6877; H02J 7/025; H02J 50/10; H02J 50/12; H02M 3/33507; H02M 3/28; H02M 3/335; H04B 5/0037

USPC .................................. 327/108–112, 427, 432
See application file for complete search history.

(56) References Cited

U.S. PATENT DOCUMENTS

| | | | |
|---|---|---|---|
| 4,077,061 A | 2/1978 | Johnston | |
| 4,122,359 A | 10/1978 | Breikss | |

(Continued)

FOREIGN PATENT DOCUMENTS

CN           102201738 A         5/2011

OTHER PUBLICATIONS

Non-Final Office Action mailed Jul. 12, 2016. U.S. Appl. No. 13/924,402, filed Jun. 21, 2013, 12 pages.

(Continued)

*Primary Examiner* — Lincoln Donovan
*Assistant Examiner* — Colleen O Toole
(74) *Attorney, Agent, or Firm* — Haverstock & Owens LLP

(57) ABSTRACT

A driver circuit is configured using a depletion-mode MOSFET to supply an output voltage across an output capacitor. The driver circuit includes a resistor positioned between two terminals of the MOSFET. In the case of an n-channel depletion-mode MOSFET, the resistor is coupled to the source and the gate. The circuit is a current controlled depletion driver that turns OFF the depletion-mode MOSFET by driving a reverse current through the resistor to establish a negative potential at the gate relative to the source. A Zener diode is coupled between the source of the depletion-mode MOSFET and the output capacitor to establish a voltage differential between the output and the MOSFET source.

15 Claims, 2 Drawing Sheets

(56) References Cited

U.S. PATENT DOCUMENTS

| | | |
|---|---|---|
| 4,234,920 A | 11/1980 | VanNess |
| 4,245,289 A | 1/1981 | Mineck |
| 4,273,406 A | 6/1981 | Okagami |
| 4,327,298 A | 4/1982 | Burgin |
| 4,370,703 A | 1/1983 | Risberg |
| 4,381,457 A | 4/1983 | Wiles |
| 4,489,394 A | 12/1984 | Borg |
| 4,535,410 A | 8/1985 | O'Mara |
| 4,563,731 A | 1/1986 | Sato et al. |
| 4,607,323 A | 8/1986 | Sokal |
| 4,611,289 A | 9/1986 | Coppola |
| 4,642,616 A | 2/1987 | Goodwin |
| 4,645,278 A | 2/1987 | Yevak et al. |
| 4,658,204 A | 4/1987 | Goodwin |
| 4,703,191 A | 10/1987 | Ferguson |
| 4,712,160 A | 12/1987 | Sato et al. |
| 4,742,424 A | 5/1988 | Kautzer |
| 4,750,040 A | 6/1988 | Hakamada |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,884,242 A | 11/1989 | Lacy |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 4,985,804 A | 1/1991 | Campbell |
| 5,065,302 A | 11/1991 | Kanazawa |
| 5,090,919 A | 2/1992 | Tsuji |
| 5,101,322 A | 3/1992 | Ghaem et al. |
| 5,105,182 A | 4/1992 | Shindo |
| 5,126,931 A | 6/1992 | Jitaru |
| 5,132,890 A | 7/1992 | Blandino |
| 5,235,491 A | 8/1993 | Weiss |
| 5,283,792 A | 2/1994 | Davies, Jr. |
| 5,325,283 A | 6/1994 | Farrington et al. |
| 5,365,403 A | 11/1994 | Vinciarelli et al. |
| 5,373,432 A | 12/1994 | Vollin |
| 5,434,768 A | 7/1995 | Jitaru et al. |
| 5,437,040 A | 7/1995 | Campbell |
| 5,442,540 A | 8/1995 | Hua |
| 5,673,185 A | 9/1997 | Albach et al. |
| 5,712,772 A * | 1/1998 | Telefus ............... H02M 1/38 363/21.02 |
| 5,717,936 A | 2/1998 | Uskali |
| 5,724,026 A | 3/1998 | Allen |
| 5,786,992 A | 7/1998 | Vinciarelli et al. |
| 5,790,395 A | 8/1998 | Hagen |
| 5,811,895 A | 9/1998 | Suzuki et al. |
| 5,838,171 A | 11/1998 | Davis |
| 5,838,554 A | 11/1998 | Lanni |
| 5,859,771 A | 1/1999 | Kniegl |
| 5,905,369 A | 5/1999 | Ishii et al. |
| 5,923,543 A | 7/1999 | Choi |
| 5,949,672 A | 9/1999 | Bernet |
| 5,974,551 A | 10/1999 | Lee |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,301,133 B1 | 10/2001 | Cuadra |
| 6,307,761 B1 | 10/2001 | Nakagawa |
| 6,323,627 B1 | 11/2001 | Schmiederer et al. |
| 6,331,794 B1 * | 12/2001 | Blanchard ............... 327/112 |
| 6,333,650 B1 | 12/2001 | Amin |
| 6,356,465 B2 | 3/2002 | Yasumura |
| 6,366,476 B1 | 4/2002 | Yasumura |
| 6,385,059 B1 | 5/2002 | Telefus et al. |
| 6,385,061 B1 | 5/2002 | Turchi |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranuki |
| 6,459,175 B1 | 10/2002 | Potega |
| 6,466,460 B1 | 10/2002 | Rain |
| 6,480,809 B1 | 11/2002 | Slaight |
| 6,487,098 B2 | 11/2002 | Malik et al. |
| 6,490,181 B1 | 12/2002 | Liu et al. |
| 6,507,174 B1 | 1/2003 | Qian |
| 6,535,996 B1 | 3/2003 | Brewer |
| 6,549,409 B1 | 4/2003 | Saxelby et al. |
| 6,578,253 B1 | 6/2003 | Herbert |
| 6,721,192 B1 | 4/2004 | Yang et al. |
| 6,768,222 B1 | 7/2004 | Ricks |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,205,752 B2 | 4/2007 | Jansen |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,395,452 B2 | 7/2008 | Nicholson |
| 7,450,388 B2 | 11/2008 | Beihoff et al. |
| 7,564,706 B1 | 7/2009 | Herbert |
| 7,596,007 B2 | 9/2009 | Phadke |
| 7,659,678 B2 * | 2/2010 | Maiocchi ............... 318/400.22 |
| 7,679,347 B2 | 3/2010 | He |
| 7,701,305 B2 | 4/2010 | Lin et al. |
| 7,730,676 B2 | 6/2010 | Hon |
| 7,755,914 B2 | 7/2010 | Telefus et al. |
| 7,760,519 B2 | 7/2010 | Telefus et al. |
| 7,924,577 B2 | 4/2011 | Jansen et al. |
| 7,924,578 B2 | 4/2011 | Jansen et al. |
| 7,940,533 B2 | 5/2011 | Mansfield et al. |
| 7,978,489 B1 | 7/2011 | Telefus et al. |
| 8,018,743 B2 | 9/2011 | Wang |
| 8,040,117 B2 | 10/2011 | Telefus |
| 8,059,434 B2 | 11/2011 | Huang et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,193,662 B1 | 6/2012 | Carlson |
| 8,194,417 B2 | 6/2012 | Chang |
| 8,207,717 B2 | 6/2012 | Uruno et al. |
| 8,233,298 B2 | 7/2012 | Jang |
| 8,243,472 B2 | 8/2012 | Chang et al. |
| 8,279,646 B1 | 10/2012 | Hamstra |
| 8,289,741 B2 | 10/2012 | Jungreis |
| 8,344,689 B2 | 1/2013 | Boguslavskij |
| 8,369,111 B2 | 2/2013 | Balakrishnan et al. |
| 8,400,801 B2 | 3/2013 | Shinoda |
| 8,441,810 B2 | 5/2013 | Telefus et al. |
| 8,488,340 B2 | 7/2013 | Zhang et al. |
| 8,520,410 B2 | 8/2013 | Telefus et al. |
| 8,654,553 B1 | 2/2014 | Ye |
| 9,007,087 B2 | 4/2015 | Avritch |
| 9,049,028 B2 | 6/2015 | Tajima et al. |
| 2001/0036091 A1 | 11/2001 | Yasumura |
| 2002/0008963 A1 | 1/2002 | DiBene et al. |
| 2002/0011823 A1 | 1/2002 | Lee |
| 2002/0036200 A1 | 3/2002 | Ulrich et al. |
| 2002/0121882 A1 | 9/2002 | Matsuo |
| 2002/0196644 A1 | 12/2002 | Hwang |
| 2003/0035303 A1 | 2/2003 | Balakrishnan et al. |
| 2003/0112645 A1 | 6/2003 | Schlecht |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |

(56) References Cited

U.S. PATENT DOCUMENTS

| | | |
|---|---|---|
| 2005/0117376 A1 | 6/2005 | Wilson |
| 2005/0138437 A1 | 6/2005 | Allen et al. |
| 2005/0194942 A1 | 9/2005 | Hack et al. |
| 2005/0218942 A1 | 10/2005 | Yamashita |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0146461 A1 | 7/2006 | Jones |
| 2006/0152947 A1 | 7/2006 | Baker et al. |
| 2006/0198172 A1 | 9/2006 | Wood |
| 2006/0208711 A1 | 9/2006 | Soldano |
| 2006/0213890 A1 | 9/2006 | Kooken et al. |
| 2006/0232220 A1 | 10/2006 | Melis |
| 2007/0040516 A1 | 2/2007 | Chen |
| 2007/0087784 A1 | 4/2007 | Yamamoto et al. |
| 2007/0120542 A1 | 5/2007 | LeMay |
| 2007/0121981 A1 | 5/2007 | Koh et al. |
| 2007/0138971 A1 | 6/2007 | Chen |
| 2007/0242487 A1 | 10/2007 | Orr |
| 2007/0247091 A1 | 10/2007 | Maiocchi |
| 2007/0263415 A1 | 11/2007 | Jansen et al. |
| 2007/0279955 A1 | 12/2007 | Liu |
| 2008/0002444 A1 | 1/2008 | Shekhawat |
| 2008/0018265 A1 | 1/2008 | Lee et al. |
| 2008/0043496 A1 | 2/2008 | Yang |
| 2008/0130322 A1 | 6/2008 | Artusi |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0089604 A1 | 4/2009 | Malik |
| 2009/0168472 A1 | 7/2009 | Chung |
| 2009/0196073 A1 | 8/2009 | Nakahori |
| 2009/0207637 A1 | 8/2009 | Boeke |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0103711 A1 | 4/2010 | Komatsuzaki |
| 2010/0253310 A1 | 10/2010 | Fonderie |
| 2010/0254057 A1 | 10/2010 | Chen |
| 2010/0289466 A1 | 11/2010 | Telefus |
| 2010/0317216 A1 | 12/2010 | Pocrass |
| 2010/0322441 A1 | 12/2010 | Weiss et al. |
| 2010/0332857 A1 | 12/2010 | Vogman |
| 2011/0013437 A1 | 1/2011 | Uruno |
| 2011/0037444 A1 | 2/2011 | Wildash |
| 2011/0096574 A1 | 4/2011 | Huang |
| 2011/0112700 A1 | 5/2011 | Tajima |
| 2011/0132899 A1 | 6/2011 | Shimomugi et al. |
| 2011/0211376 A1 | 9/2011 | Hosotani |
| 2011/0213999 A1 | 9/2011 | Lecourtier |
| 2011/0215647 A1 | 9/2011 | Lecourtier |
| 2011/0222318 A1 | 9/2011 | Uno |
| 2011/0261590 A1 | 10/2011 | Liu |
| 2012/0112657 A1 | 5/2012 | Van Der Veen et al. |
| 2012/0113686 A1 | 5/2012 | Telefus et al. |
| 2012/0113692 A1 | 5/2012 | Telefus |
| 2012/0144183 A1 | 6/2012 | Heinrichs |
| 2012/0153917 A1 | 6/2012 | Adell |
| 2013/0003427 A1 | 1/2013 | Pan |
| 2013/0016545 A1 | 1/2013 | Xu |
| 2013/0154391 A1* | 6/2013 | Urciuoli ............... H03K 17/081 307/112 |
| 2013/0155728 A1 | 6/2013 | Melanson |
| 2013/0250629 A1 | 9/2013 | Xu |
| 2013/0329469 A1 | 12/2013 | Kubota |
| 2014/0008979 A1 | 1/2014 | Kinnard |
| 2014/0078790 A1 | 3/2014 | Lin |
| 2014/0091839 A1* | 4/2014 | Peters et al. .................. 327/109 |
| 2014/0211515 A1 | 7/2014 | Tomioka |
| 2014/0233275 A1 | 8/2014 | Yang |
| 2015/0052390 A1 | 2/2015 | Dryer |
| 2016/0025793 A1 | 1/2016 | Oestreicher |

OTHER PUBLICATIONS

Non-Final Office Action mailed Jul. 21, 2016. U.S. Appl. No. 13/924,388, filed Jun. 21, 2013, 16 pages.

Non-Final office Action dated Apr. 6, 2017, U.S. Appl. No. 14/821,449, filed Aug. 7, 2015, 36 pages.

* cited by examiner

DEPLETION MOSFET DRIVER

RELATED APPLICATIONS

This Patent Application claims priority under 35 U.S.C. 119 (e) of the U.S. Provisional Application Ser. No. 61/799,124, filed Mar. 15, 2013, and entitled "New Power Management Integrated Circuit Partitioning With Dedicated Primary Side Control Winding". This application incorporates U.S. Provisional Application Ser. No. 61/799,124 in its entirety by reference.

FIELD OF THE INVENTION

The present invention is generally directed to the field of MOSFET drivers. More specifically, the present invention is directed to a depletion mode MOSFET driver.

BACKGROUND OF THE INVENTION

A metal-oxide-semiconductor field-effect transistor (MOSFET) is a transistor used for amplifying or switching electronic signals. In enhancement mode MOSFETs, a voltage drop across the oxide induces a conducting channel between the source and drain contacts via the field effect. The term "enhancement mode" refers to the increase of conductivity with increase in oxide field that adds carriers to the channel, also referred to as the inversion layer. To turn ON the enhancement-mode MOSFET, a voltage is applied to the gate. In depletion mode MOSFETs, the channel consists of carriers in a surface impurity layer of opposite type to the substrate, and conductivity is decreased by application of a field that depletes carriers from this surface layer.

Depletion-mode MOSFETs are doped so that a channel exists even with zero voltage from gate to source. As such, the depletion-mode MOSFET is turned ON without applying a voltage to the gate. To control the channel, a negative voltage is applied to the gate (for an n-channel device), depleting the channel, which reduces the current flow through the device.

Depletion-mode MOSFETs are commonly used in driver circuits. To turn OFF the depletion-mode MOSFET, a negative gate-to-source voltage must be applied. This is typically done by utilizing voltage control to pull the gate voltage to ground.

SUMMARY OF THE INVENTION

A driver circuit is configured using a depletion-mode MOSFET to supply an output voltage across an output capacitor. The driver circuit includes a resistor positioned between two terminals of the MOSFET. In the case of an n-channel depletion-mode MOSFET, the resistor is coupled to the source and the gate. The circuit is a current controlled depletion driver that turns OFF the depletion-mode MOSFET by driving a reverse current through the resistor to establish a negative potential at the gate relative to the source. A Zener diode is coupled between the source of the depletion-mode MOSFET and the output capacitor to establish a voltage differential between the output and the MOSFET source.

In an aspect, a current driven depletion-mode MOSFET-based driver circuit is disclosed. The driver circuit includes a depletion-mode MOSFET, an output capacitor, a transistor and a resistor. The depletion-mode MOSFET has a first terminal, a second terminal and a gate, wherein the first terminal is coupled to a power supply. The output capacitor is coupled to the second terminal of the depletion-mode MOSFET. The transistor has a first terminal to receive a driving voltage, a second terminal and a third terminal coupled to ground. The first terminal of the transistor is coupled to the output capacitor, and the second terminal of the transistor is coupled to the gate of the depletion-mode MOSFET. The resistor has a first terminal and a second terminal. The first terminal of the resistor is coupled to the output capacitor and the second terminal of the depletion-mode MOSFET. The second terminal of the resistor is coupled to the gate of the depletion-mode MOSFET and the second terminal of the transistor.

In some embodiments, the depletion-mode MOSFET is a N-channel MOSFET, and the first terminal of the resistor is coupled to a source of the depletion-mode MOSFET. In other embodiments, the depletion-mode MOSFET is a P-channel MOSFET, and the first terminal of the resistor is coupled to a drain of the depletion-mode MOSFET. In some embodiments, the driver circuit also includes a voltage divider coupled between the output capacitor and the first terminal of the transistor. In some embodiments, the voltage divider is configured to supply a turn ON voltage to a gate of the transistor when a voltage across the output capacitor is equal to or greater than a threshold voltage.

In some embodiments, when the transistor is turned ON, a reverse current flows through the resistor, thereby resulting in a negative voltage potential between the gate and the second terminal of the depletion-mode MOSFET which turns OFF the depletion-mode MOSFET. In some embodiments, the reverse current flows from the output capacitor, through the resistor, and through the transistor. In some embodiments, the reverse current flow results in the voltage across the output capacitor dropping, further wherein when the voltage across the output capacitor drops below a minimum value, the voltage supplied to the gate of the transistor drops below the turn ON voltage and the transistor turns OFF. In some embodiments, when the transistor turns OFF, the reverse current stops and the depletion-mode MOSFET turns ON.

In some embodiments, the driver circuit also includes a Zener diode having a cathode coupled to the second terminal of the depletion-mode MOSFET and an anode coupled to the output capacitor. In some embodiments, the first terminal of the resistor is coupled to the cathode of the Zener diode and the second terminal of the depletion-mode MOSFET.

In another aspect, another current driven depletion-mode MOSFET-based driver circuit is disclosed. The driver circuit includes a depletion-mode MOSFET, an output capacitor, a Zener diode, a voltage divider, a transistor and a resistor. The depletion-mode MOSFET has a first terminal, a second terminal and a gate, wherein the first terminal is coupled to a power supply. The Zener diode has a cathode coupled to the second terminal of the depletion mode MOSFET and an anode coupled to a first terminal of the output capacitor. The voltage divider is coupled to the first terminal of the output capacitor. The transistor has a first terminal to receive a driving voltage, a second terminal and a third terminal coupled to ground. The first terminal of the transistor is coupled to the voltage divider, and the second terminal of the transistor is coupled to the gate of the depletion-mode MOSFET. The resistor has a first terminal and a second terminal. The first terminal of the resistor is coupled to the cathode of the Zener diode and the second terminal of the depletion-mode MOSFET. The second terminal of the resistor is coupled to the gate of the depletion-mode MOSFET and the second terminal of the transistor.

In yet another aspect, a method of driving a depletion-mode MOSFET based driver circuit is disclosed. The method includes configuring a driver circuit including a depletion-mode MOSFET, an output capacitor, a transistor and a resistor. The depletion-mode MOSFET includes a first terminal coupled to a power supply, a second terminal coupled to the output capacitor and a gate. The transistor includes a gate coupled to the output capacitor, a first terminal coupled to the gate of the depletion-mode MOSFET and a second terminal coupled to ground. The resistor includes a first terminal coupled to the output capacitor and the second terminal of the depletion-mode MOSFET and a second terminal coupled to the gate of the depletion-mode MOSFET and the first terminal of the transistor. The method also included turning ON the transistor, thereby driving a reverse current through the resistor from the first terminal to the second terminal, resulting in a negative voltage potential between the gate of the depletion-mode MOSFET and the second terminal of the depletion-mode MOSFET which turns OFF the depletion-mode MOSFET.

In some embodiments, the reverse current flows from the output capacitor, through the resistor, and through the transistor. In some embodiments, the reverse current flow results in the voltage across the output capacitor dropping, wherein when the voltage across the output capacitor drops below a minimum value, the voltage supplied to the gate of the transistor drops below a turn ON voltage of the transistor and the transistor turns OFF. In some embodiments, when the transistor turns OFF, the reverse current stops and the depletion-mode MOSFET turns ON. In some embodiments, the method also includes supplying a turn ON voltage to the gate of the transistor when a voltage across the output capacitor is equal to or greater than a threshold voltage.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a depletion MOSFET driver. Those of ordinary skill in the art will realize that the following detailed description of the depletion MOSFET driver is illustrative only and is not intended to be in any way limiting. Other embodiments of the depletion MOSFET driver will readily suggest themselves to such skilled persons having the benefit of this disclosure.

Reference will now be made in detail to implementations of the depletion MOSFET driver as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
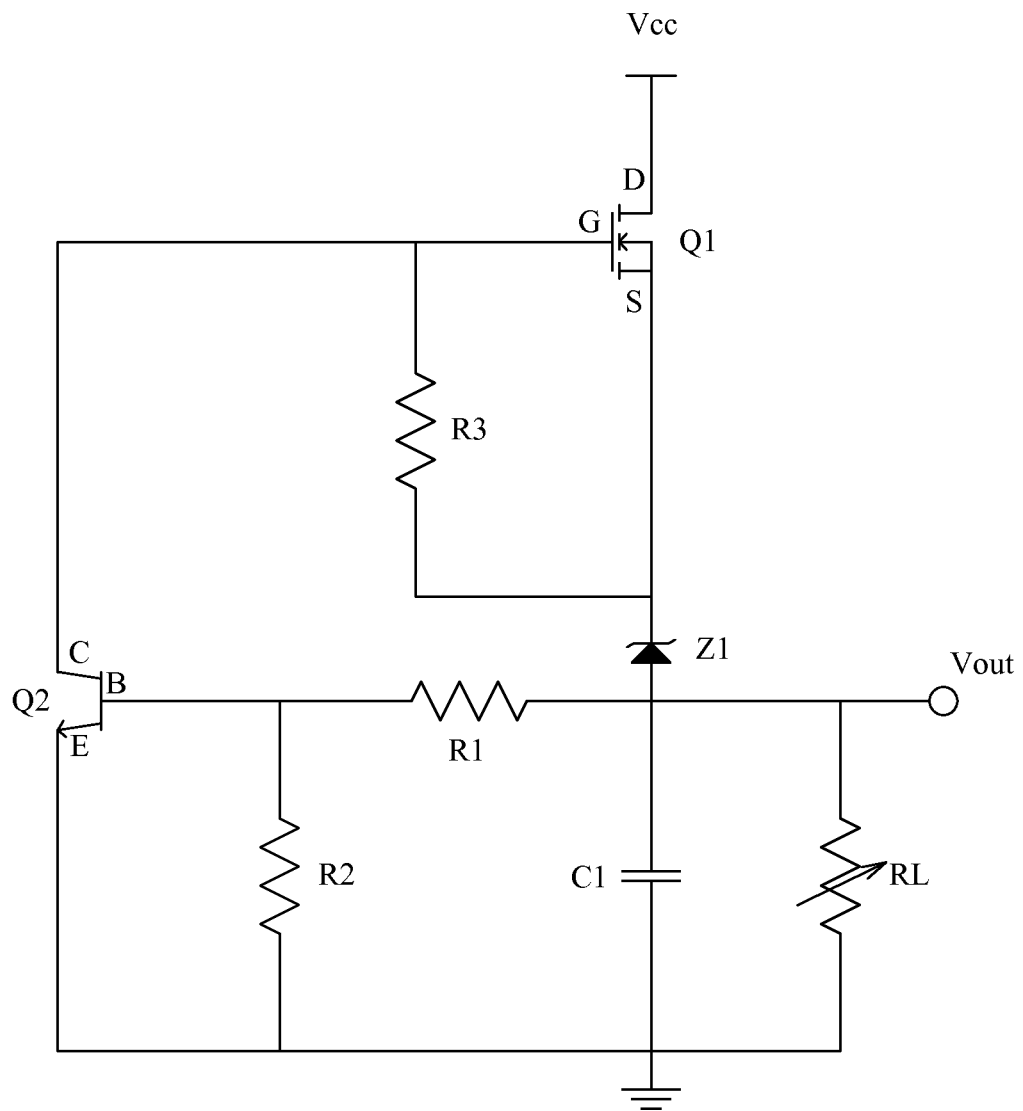
FIG. 1 illustrates a depletion-mode MOSFET driver circuit according to an embodiment.

FIG. 1 illustrates a depletion-mode MOSFET driver circuit according to an embodiment. The driving circuit includes a depletion-mode MOSFET Q1, a Zenor diode Z1, a transistor Q2, resistors R1, R2 and R3, capacitor C1, and a resistor RL that represents a load coupled to the capacitor C1. In this exemplary embodiment, the depletion-mode MOSFET Q1 is an n-channel depletion-mode MOSFET and the transistor Q2 is an NPN bipolar junction transistor (BJT). It is understood that the depletion-mode MOSFET Q1 can alternatively be a p-channel depletion-mode MOSFET. It is also understood, that the transistor Q2 can be an alternative type of transistor than a BJT. A Zener diode is a diode which allows current to flow in the forward direction in the same manner as an ideal diode, but also permits current to flow in the reverse direction when the voltage is above a certain value.

When connected to voltage supply Vcc, the natural state of the depletion-mode MOSFET Q1 is ON when zero voltage is applied to the gate. When the depletion-mode MOSFET Q1 is ON, current flows through the depletion-mode MOSFET Q1, through the Zener diode Z1, to the capacitor C1 so that the capacitor C1 becomes charged.

To turn OFF the depletion-mode MOSFET Q1, a negative voltage needs to be applied to the gate, or more specifically the gate-to-source voltage Vgs must be negative in which case the gate voltage is lower than the source voltage.

The resistors R1 and R2 form a voltage divider to supply a drive voltage to the gate of the transistor Q2. In an exemplary application, Vcc=200V and the capacitor C1 is charged to 15V. The resistors R1 and R2 are configured to supply sufficient turn ON voltage to the gate of the transistor Q2 when the capacitor C1 has a threshold voltage, such as fully charged. In an exemplary application, the turn ON voltage for the transistor Q2 is approximately 1V and the voltage divider is configured to supply 1V to the gate of the transistor Q2 when the capacitor C1 is charged to 15V.

Figure 2:
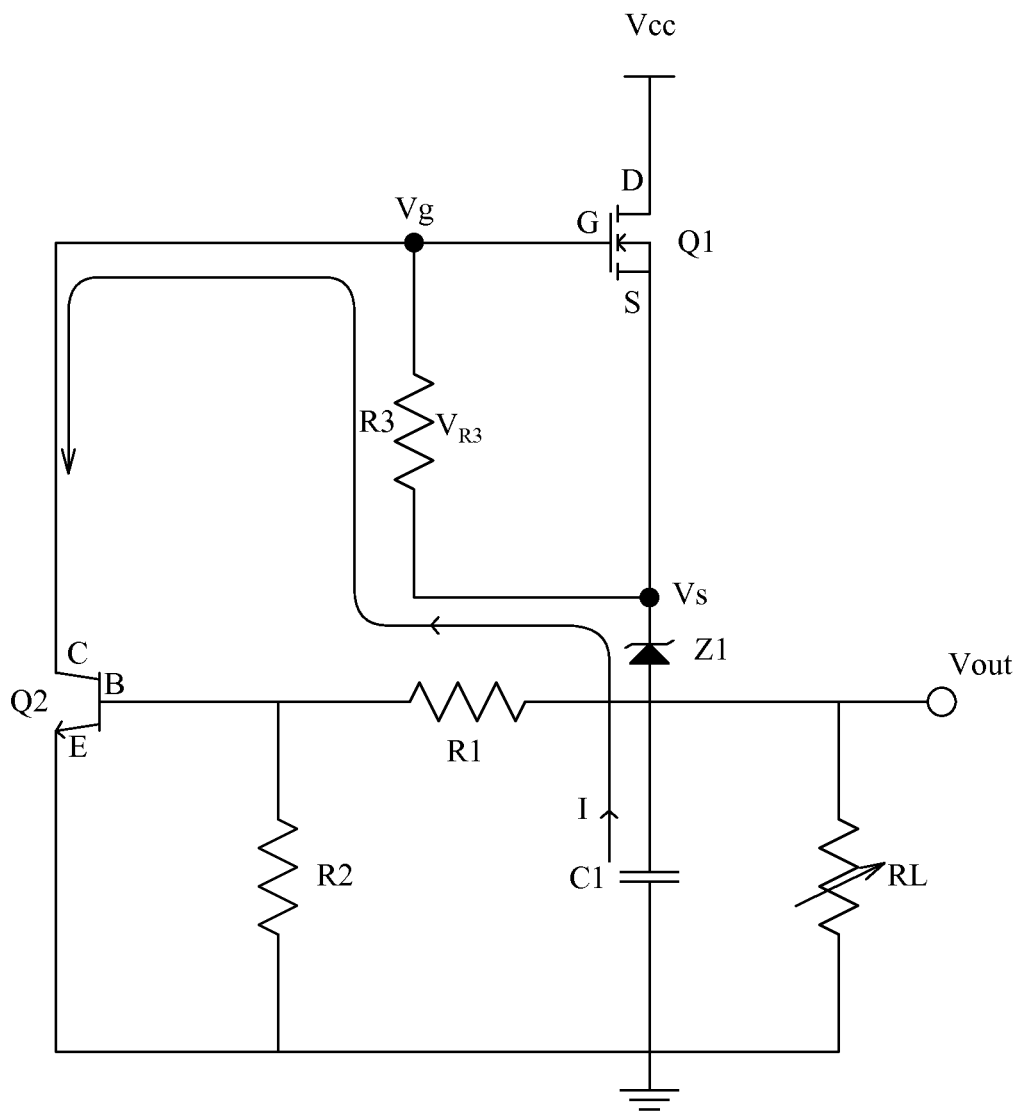
FIG. 2 illustrates reverse current flow in the depletion-mode MOSFET driver circuit of FIG. 1.

In an exemplary application, the voltage drop across the Zener diode Z1 is 5V. When capacitor C1 is charged at 15V, the voltage Vs at the source of the depletion-mode MOSFET Q1 is 10V. With the voltage across the capacitor C1 at least at the threshold voltage, the voltage at the gate of the transistor Q2 is sufficient to turn ON the transistor Q2. When the transistor Q2 turns ON, a reverse current I flows from capacitor C1, through Zener diode Z1, through resistor R3, through the transistor Q2 to ground, as shown in FIG. 2. With reverse current flow through the resistor R3, there is a voltage drop VR3 across resistor R3, and therefore the voltage Vg at the gate of the transistor Q1 is less than the voltage Vs at the source, Vg=Vs−VR3. The reverse current through the resistor R3 establishes a negative potential at the gate of the depletion-mode MOSFET Q1 relative to the source. This is a negative gate-to-source voltage Vgs, which turns OFF the depletion-mode MOSFET Q1. In an exemplary application, the resistor R3 has a resistance of 1 megaohm.

This circuit configuration is a current controlled depletion driver that drives reverse current from the capacitor C1 through the transistor Q2. Reverse current is driven through the resistor R3 toward the transistor Q2 in order to turn OFF the depletion-mode MOSFET Q1. Specifically, driving reverse current through the resistor R3 results in a voltage drop across resistor R3, which results in a negative gate-to-source voltage Vgs at the depletion-mode MOSFET Q1. Negative gate-to-source voltage Vgs turns OFF the depletion-mode MOSFET Q1. This current controlled driver is contrasted with conventional depletion-mode MOSFET drivers that utilize voltage control to turn OFF the depletion-mode MOSFET. The Zener diode Z1 establishes a voltage differential between the source voltage Vs and the output voltage Vout. The Zenor diode Z1 and the capacitor C1 function as a current source when the transistor Q2 is turned ON. The Zenor diode Z1 is also used as an extra bias element to establish a larger output voltage bandwidth within which the transistor Q1 can be turned OFF.

As reverse current I flows from the capacitor C1, through the Zener diode Z1, the resistor R3 and the transistor Q2, the capacitor C1 discharges. Once the capacitor C1 discharges to a certain level, the voltage supplied to the gate of the transistor Q2 drops below the turn ON voltage and the transistor Q2 turns OFF, which stops the reverse current flow. With no reverse current flow, the gate-to-source voltage Vgs of the depletion-mode MOSFET is no longer negative, and the depletion-mode MOSFET turns back ON.

Another advantage of this circuit is that the leakage current of the depletion-mode MOSFET Q1 is diverted with the reverse current flow to ground. The leakage current no longer flows to the output.

The present application has been described in terms of specific embodiments incorporating details to facilitate the understanding of the principles of construction and operation of the depletion MOSFET driver. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A current driven depletion-mode MOSFET-based driver circuit comprising:
   a. a depletion-mode MOSFET having a first terminal, a second terminal and a gate, wherein the first terminal is coupled to a power supply;
   b. an output capacitor having a first terminal and a second terminal, wherein the second terminal of the output capacitor is coupled to be in direct electrical contact with ground;
   c. a Zener diode having a cathode coupled to be in direct electrical contact with the second terminal of the depletion mode MOSFET and an anode coupled to be in direct electrical contact with the first terminal of the output capacitor;
   d. a voltage divider coupled to be in direct electrical contact with the first terminal of the output capacitor;
   e. a transistor having a first terminal to receive a driving voltage, a second terminal and a third terminal coupled to be in direct electrical contact with ground, wherein the first terminal of the transistor is coupled to be in direct electrical contact with the voltage divider, and the second terminal of the transistor is coupled to be in direct electrical contact with the gate of the depletion-mode MOSFET; and
   f. a resistor having a first terminal and a second terminal, wherein the first terminal of the resistor is coupled to be in direct electrical contact with the cathode of the Zener diode and is coupled to be in direct electrical contact with the second terminal of the depletion-mode MOSFET, and the second terminal of the resistor is coupled to be in direct electrical contact with the gate of the depletion-mode MOSFET and is coupled to be in direct electrical contact with the second terminal of the transistor such that a connection is formed between the second terminal of the depletion-mode MOSFET and the gate of the depletion-mode MOSFET via the resistor.

2. The driver circuit of claim 1 wherein the depletion-mode MOSFET is a N-channel MOSFET, and the first terminal of the resistor is coupled to a source of the depletion-mode MOSFET.

3. The driver circuit of claim 1 wherein the depletion-mode MOSFET is a P-channel MOSFET, and the first terminal of the resistor is coupled to a drain of the depletion-mode MOSFET.

4. The driver circuit of claim 1 wherein the voltage divider is configured to supply a turn ON voltage to the first terminal of the transistor when a voltage across the output capacitor is equal to or greater than a threshold voltage.

5. The driver circuit of claim 1 wherein when the transistor is turned ON, a reverse current flows through the resistor, thereby resulting in a negative voltage potential between the gate and the second terminal of the depletion-mode MOSFET which turns OFF the depletion-mode MOSFET.

6. The driver circuit of claim 5 wherein the reverse current flows in series from the output capacitor, through the resistor, and through the transistor.

7. The driver circuit of claim 5 wherein the reverse current flow results in the voltage across the output capacitor dropping, further wherein when the voltage across the output capacitor drops below a minimum value, the voltage supplied to the first terminal of the transistor drops below the turn ON voltage and the transistor turns OFF.

8. The driver of claim 7 wherein when the transistor turns OFF, the reverse current stops and the depletion-mode MOSFET turns ON.

9. The driver circuit of claim 1 wherein the voltage divider outputs a divided output capacitor voltage, and the divided output capacitor voltage is the driving voltage input to the first terminal of the transistor.

10. A method of driving a depletion-mode MOSFET based driver circuit, the method comprising:
   a. configuring a driver circuit including a depletion-mode MOSFET, an output capacitor, Zener diode, a voltage divider, a transistor and a resistor, wherein the output capacitor comprises a first terminal and a second terminal, the second terminal of the output capacitor to be in direct electrical contact with ground, wherein the depletion-mode MOSFET comprises a first terminal coupled to a power supply, a second terminal coupled to be in direct electrical contact with a cathode of the Zener diode and a gate, wherein an anode of the Zener diode is coupled to be in direct electrical contact with the first terminal of the output capacitor, wherein the voltage divider is coupled to be in direct electrical contact with the first terminal of the output capacitor, wherein the transistor comprises a first terminal coupled to be in direct electrical contact with the voltage divider, a second terminal coupled to be in direct electrical contact with the gate of the depletion-mode MOSFET and a third terminal coupled to be in direct electrical contact with ground, wherein the resistor comprises a first terminal coupled to be in direct electrical contact with the cathode of the Zener diode and coupled to be in direct electrical contact with the second terminal of the depletion-mode MOSFET and a second terminal coupled to be in direct electrical contact with the gate of the depletion-mode MOSFET and coupled to be in direct electrical contact with the second terminal of the transistor such that a connection is formed between the second terminal of the depletion-mode MOSFET and the gate of the depletion-mode MOSFET via the resistor; and b. turning ON the transistor, thereby driving a reverse current through the resistor from the first terminal to the second terminal, resulting in a negative voltage potential between the gate of the depletion-mode MOSFET and the second terminal of the depletion-mode MOSFET which turns OFF the depletion-mode MOSFET.

11. The method of claim 10 wherein the reverse current flows in series from the output capacitor, through the Zener diode, through the resistor, and through the transistor.

12. The method of claim 11 wherein the reverse current flow results in the voltage across the output capacitor dropping, further wherein when the voltage across the output capacitor drops below a minimum value, the voltage supplied to the first terminal of the transistor drops below a turn ON voltage of the transistor and the transistor turns OFF.

13. The method of claim 12 wherein when the transistor turns OFF, the reverse current stops and the depletion-mode MOSFET turns ON.

14. The method of claim 10 further comprising supplying a turn ON voltage to the first terminal of the transistor when a voltage across the output capacitor is equal to or greater than a threshold voltage.

15. The method of claim 10 wherein the voltage divider outputs a divided output capacitor voltage, and the divided output capacitor voltage is a driving voltage input to the first terminal of the transistor.

* * * * *